United States Patent [19]
Greer et al.

[11] Patent Number: 5,959,622
[45] Date of Patent: Sep. 28, 1999

[54] STILL IMAGE CAPTURE UNDER COMPUTER CONTROL IN RESPONSE TO USER-INSTRUCTED TRIGGER

[75] Inventors: Paul E. Greer; Bill A. Munson; Andrew T. Wilson, all of Portland, Oreg.

[73] Assignee: Intel Corporation, Santa Clara, Calif.

[21] Appl. No.: 08/656,064

[22] Filed: May 31, 1996

[51] Int. Cl.⁶ .................................................. G06T 1/00
[52] U.S. Cl. .............................................................. 345/330
[58] Field of Search ................................... 345/326–335, 345/347–354

[56] References Cited

U.S. PATENT DOCUMENTS 5,539,454  7/1996  Williams ................................... 348/169
5,541,656  7/1996  Kare et al. ................................ 348/334
5,633,678  5/1997  Parulski et al. .......................... 348/232
5,768,151  6/1998  Lowy et al. ................................ 463/2

*Primary Examiner*—Almis R. Jankus
*Attorney, Agent, or Firm*—William H. Murray, Esq.; N. Stephan Kinsella, Esq.

[57] ABSTRACT

Still image capture under computer control. The computer is instructed to capture the still image capture at an occurrence of a trigger and, subsequently in time, captures the still image. In embodiments, the instructions can be made through a graphical user interface (GUI) displayed on a monitor or a keyboard coupled to the computer. The instruction can start a timed count until the still image is captured. In embodiments the trigger can be an external event, such as sound or motion sensed by appropriate transducers. In yet other embodiments, the computer issues a notification of an occurrence of a capture or a warning of an impending capture.

11 Claims, 5 Drawing Sheets

STILL IMAGE CAPTURE UNDER COMPUTER CONTROL IN RESPONSE TO USER-INSTRUCTED TRIGGER

BACKGROUND OF THE INVENTION

1. Field of the Invention

This invention relates to the field of image sharing between computers and more particularly to capturing a still image at one computer which can be transmitted to one or more other computers.

2. Description of the Related Art

Image sharing between computers occurs in conventional video conferencing configurations. In such configurations, remote conferencing systems are coupled through a signal-carrying network which carries video and audio signals between the conferencing systems. With the advent of advanced processors for personal computers, such conferencing systems often are personal computers properly equipped with peripherals necessary for conducting the video conference. For example, each conferencing system involved in a video conference typically has a camera and a microphone for capturing video and audio input, respectively, which are converted into signals suitable for transmission over the network to remote conferencing systems. Each conferencing system has an ability to receive signals from remote systems and includes a video display device, such as a monitor, for reproducing video, and a speaker, for reproducing sound, captured at a remote conferencing system. In such video conferencing configurations, therefore, video conference participants at remote locations are able to orally communicate while maintaining visual contact, as an acceptable substitute for a face-to-face discussion.

In certain circumstances, it is advantageous to use a conferencing system camera to capture a still image rather than a video sequence. A video sequence can be interrupted to capture the still image which typically is transmitted across the network where it may be stored or reproduced by a remote conferencing system. Such still images typically have increased resolution as compared to video.

Execution of a still image capture by a conferencing system commonly is initiated through an actuating device which is attached to or is a part of the conferencing system. For example, where a conferencing system is a PC, a still image capture conventionally occurs by depressing a key on a keyboard attached to the PC or by manipulating a mouse attached to the PC to move a mouse cursor and pressing a button on the mouse ("mouse click"). It is also known to capture a still image by actuating a switch mounted on the camera itself. In each of the above methods, it is known that the still image capture occurs at the moment of actuation.

Whether the mode of executing a still image capture is through a keyboard, a mouse or some other actuating device, it typically requires that a user be positioned nearby the conferencing system to capture the still image, considering the rather short cable links of the actuating devices, such as the keyboard, mouse or camera, to the conferencing system. Furthermore, since a user must affirmatively take some action (type, click a mouse button, depress an actuating switch) to cause a concurrent still image capture, it is difficult for the user to simultaneously aim the camera at an object to be captured, necessitating that the camera be fixed in place. A user is therefore only able to capture an image which is within the fixed camera's field of view.

SUMMARY OF THE INVENTION

Still image capture under computer control. The computer is instructed to capture the still image capture at an occurrence of a trigger and, subsequently in time, captures the still image.

BRIEF DESCRIPTION OF THE DRAWINGS

The following detailed description will be more fully understood with reference to the accompanying drawings in which.

DETAILED DESCRIPTION OF THE PREFERRED EMBODIMENT

Figure 1:
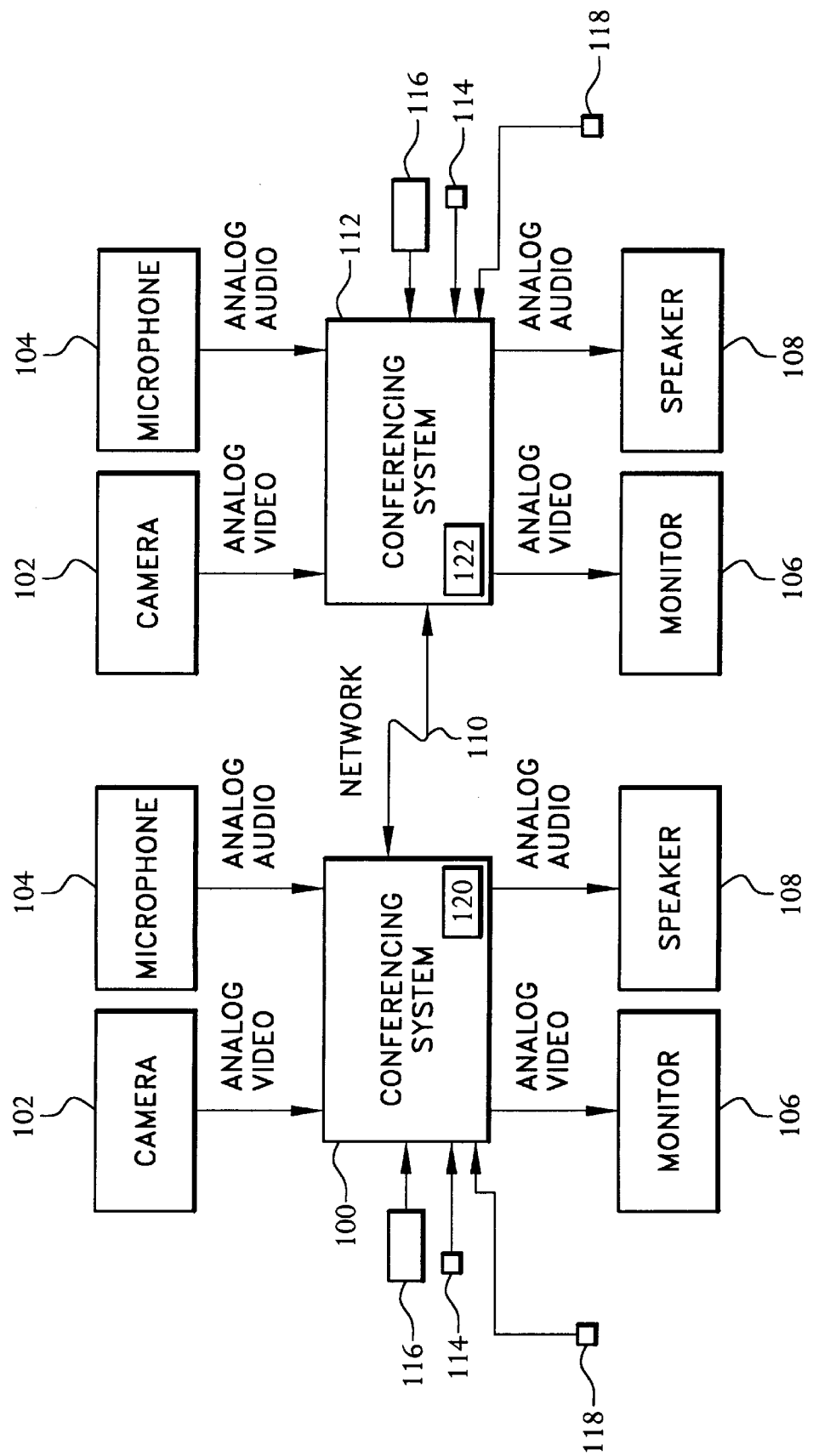
FIG. 1 shows a video conferencing configuration in accordance with the invention.

Referring to FIG. 1, an image sharing configuration between computers in accordance with the invention is shown in the embodiment of a video conferencing configuration. Conferencing systems 100 and 112 are coupled through network 110. Network 110 can be any network capable of carrying signals between conferencing systems 100 and 112, such as, but not limited to a local area network (LAN), wide area network (WAN), an integrated services digital network (ISDN), the Internet or the like. In the event network 110 is capable of carrying only analog signals, each of conferencing systems 100 and 112 are provided with internal or external modems (not shown in FIG. 1).

Conferencing systems 100 and 112 can be personal computers (PC) having processing power sufficient to meet the processing demands necessary to support a video conference. The processing power can be provided by an advanced microprocessor, such as an Intel Corporation Pentium® or Pentium® Pro microprocessor.

Conferencing systems 100 and 112 each include applications 120 and 122 for running and controlling a video conference between participants at conferencing systems 100 and 112. Applications 120 and 122 further control still image capture using cameras 102, as explained further below.

Conferencing systems 100 and 112 each have camera 102 and microphone 104 for capturing video and audio input. Conferencing systems 100 and 112 preferably have one or more analog-to-digital converters for converting analog video and audio signals captured by camera 102 and microphone 104 into digital signals. Digital audio and video signals from one of conferencing system 100 and 112 are likely first converted into analog signals by one or more digital-to-analog converters in the other of conferencing system 100 and 112 before being reproduced on monitor 106 and by speaker 108 as video and sound.

In certain circumstances, it is advantageous to use camera 102 to capture a still image rather than to record a video sequence. If necessary, a video sequence can be interrupted to capture the still image, which can be transmitted across network 110 where it may be stored or reproduced by either of conferencing systems 100 or 112.

In the invention, commands for executing a still image capture typically are entered through a keyboard 116 attached to conferencing system 100 and 112 or through a graphical user interface (GUI) displayed on monitor 106 and generated by, for example, conferencing application 120 or 122, running on conferencing system 100 and 112, respectively. In the case of a still image capture using a GUI, the still image capture is executed by moving a mouse cursor using mouse 114 to point to a designated region or the like displayed as part of the GUI and executing one or more mouse clicks using mouse 114. Keyboard 116 can be used to initiate a still image capture by depressing an appropriate sequence of keys.

Figure 2:
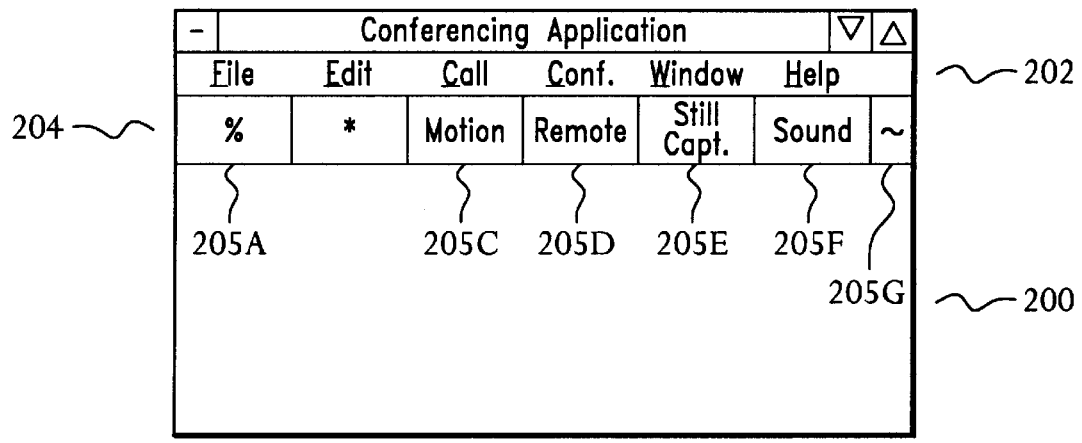
FIG. 2 shows an embodiment of a GUI generated by an application for use in implementing the still image capture of the invention.

An embodiment of a GUI generated by one of conferencing applications 120 and 122 is shown in FIG. 2. GUI 200 has menu bar 202 listing a number of features of application 120 and 122. GUI 200 further has toolbar 204 having a variety of icon-labeled buttons 205a–205g representing often used features and functions of applications 120 and 122. The features and function represented can be executed by simply moving a mouse cursor to point to one of buttons 205a–205g and clicking a button on mouse 114 to "depress" the button.

Figure 4:
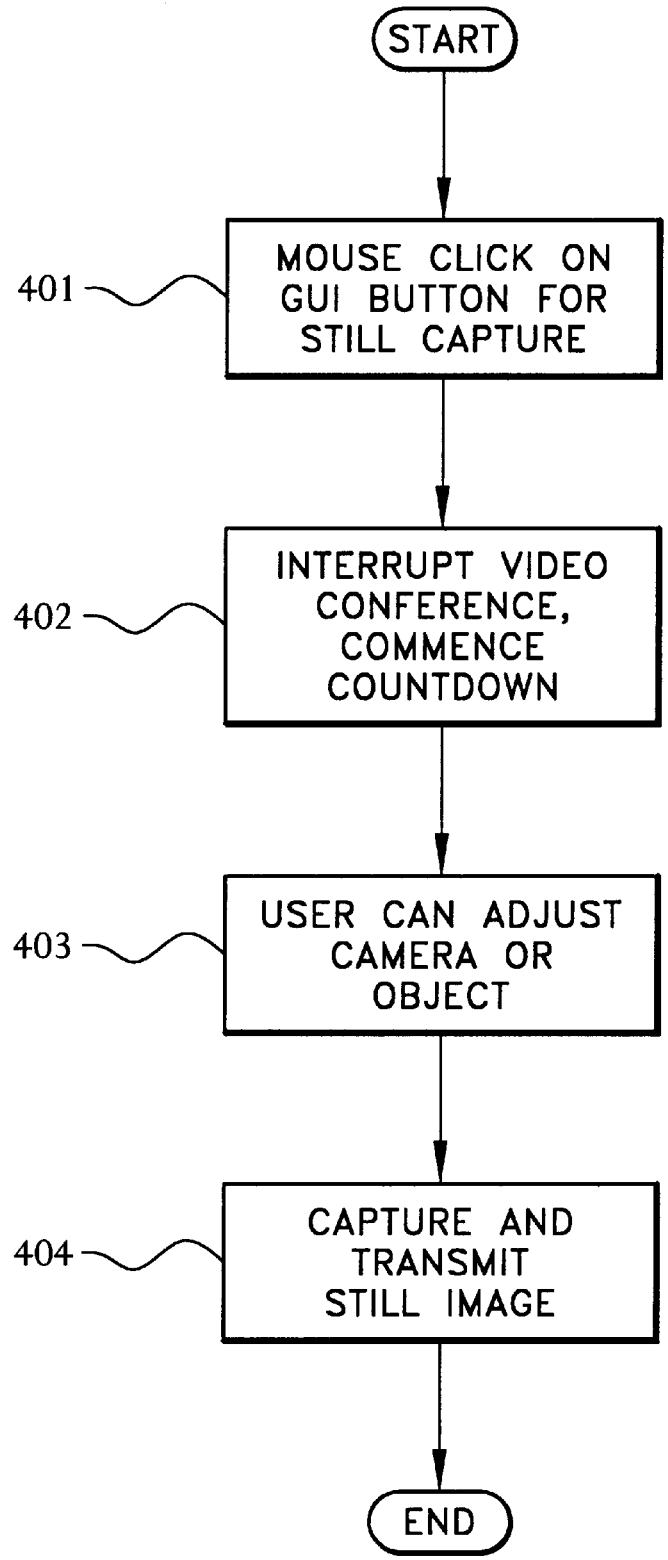
FIG. 4 is a flow chart of an embodiment of the invention.

Toolbar 204 includes still capture button 205e. Still capture button 205e causes a still image capture through camera 102 of conferencing system 100 or 112. In an embodiment, "mouse clicking" on still capture button 205e (step 401 of FIG. 4) causes execution of a still image capture routine in application 120 or 122. The still image capture routine typically interrupts any video conference occurring between conferencing systems 100 and 112 and initiates a timed countdown (step 402), at the conclusion of which camera 102 is caused to capture a still image which is transmitted to the other of conferencing system 100 and 112 for storage or display on monitor 106. The duration of the timed countdown can be preselected by a user and typically would be approximately 10 seconds to a minute, to provide a user at one of conferencing systems 100 or 112 sufficient time to point camera 102 at an object having an image which is to be captured or to move an object into the field of view of camera 102 (step 403).

At the expiration of the timed countdown, a still image will be captured by camera 102 and transmitted by the initiating conferencing system to the other (step 404). At the moment of still image capture, an embodiment of the invention signals a user at the still image capture site that a still image has been captured. One mechanism for signaling is by generation of an audible tone, reproduced by speaker 108, to indicate that the still image has been captured. Another mechanism for signaling is to provide a visible indicator or message which appears on monitor 106 at the time of capture. The visible indicator can be, for example, the actual image captured. Conferencing systems 100 or 112, and more particularly applications 120 and 122 can generate the signals which provide the audible tone or visible indicator or message. In another embodiment, an indicator, such as a light-emitting diode (LED) on camera 102 itself can be made to illuminate to signal the occurrence of the still image capture.

In a further embodiment, the invention signals a user at the still image capture site that a still image will soon be captured. For example, short bursts of an audible tone through speaker 108 or quick flashes of an image, icon or text on monitor 106 can be generated by conferencing application 120 and 122 to ready a user of conferencing system 100 or 112, respectively, for the impending still image capture. It will be understood by a person of ordinary skill that the timed countdown to still image capture discussed above can be initiated through keyboard input, rather than through a GUI, by depressing one or more designated keys.

Figure 3:
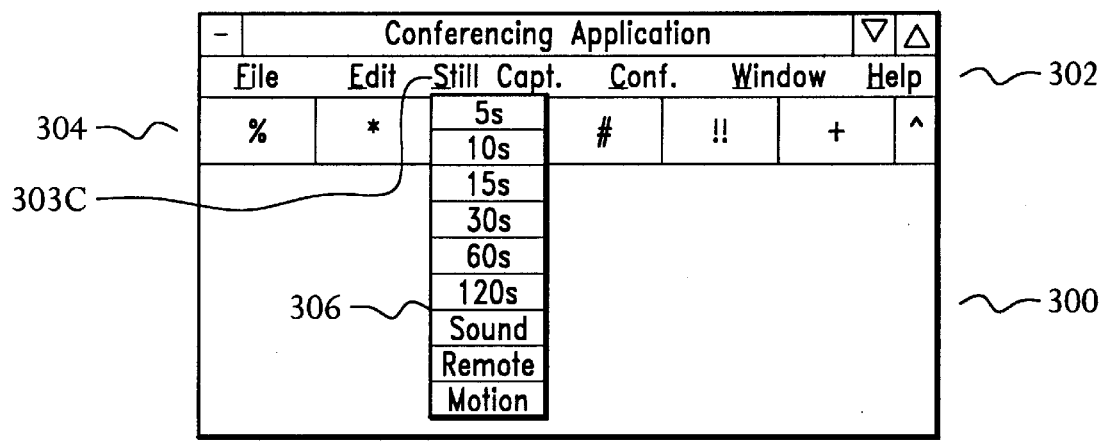
FIG. 3 shows another embodiment of a GUI generated by an application for use in implementing the still image capture of the invention.

FIG. 3 shows an alternate GUI generated by conferencing application 120 or 122 for use in implementing the still image capture of the invention. GUI 300 has menu bar 302 and toolbar 304. Rather than using toolbar 304 to activate a still image capture as was done in the implementation shown and described above with respect to FIG. 2, still image capture in the embodiment of FIG. 3 is activated through menu bar 302.

Figure 5:
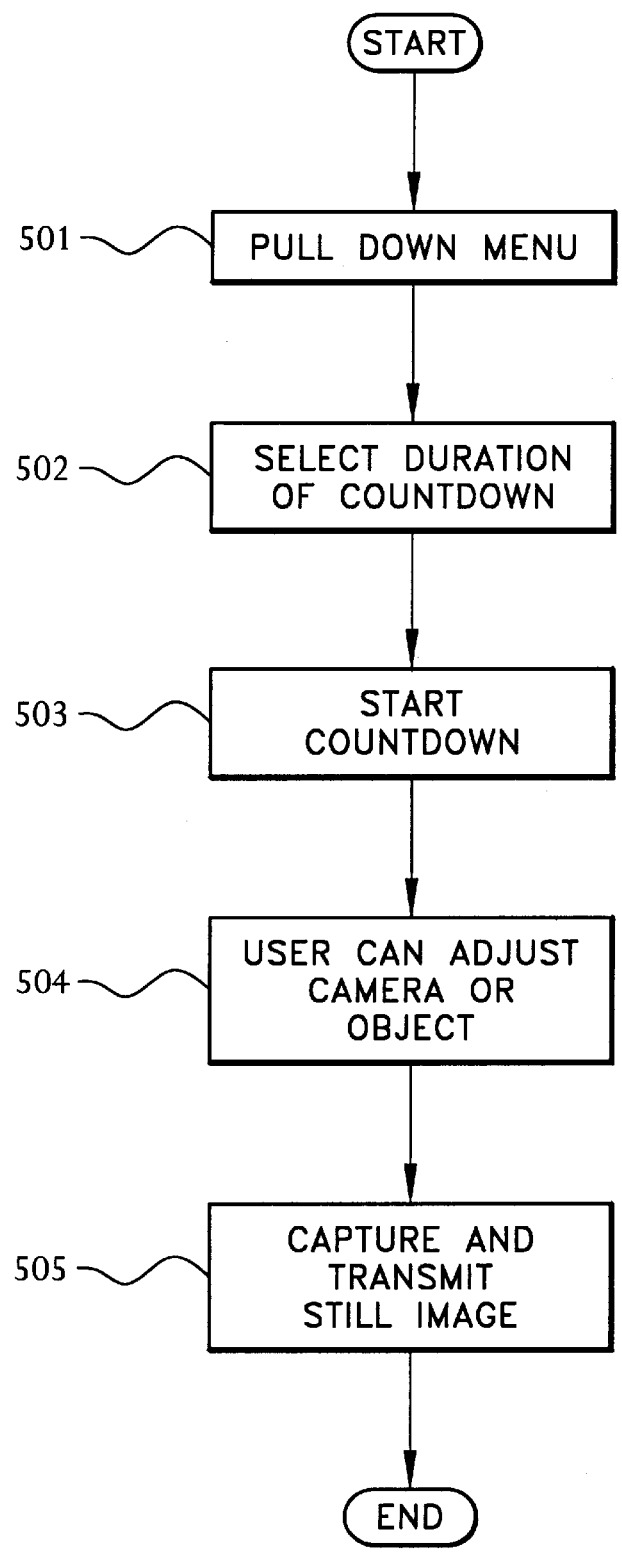
FIG. 5 is a flow chart of another embodiment of the invention.

As shown in FIG. 3 moving a mouse cursor to and clicking on the menu name StillCapt. 303c, or holding down the Alt key on keyboard 116 while simultaneously depressing the "S" key causes pull-down menu 306 to appear on monitor 106 (step 501 of FIG. 5). Pull-down menu 306 identifies a plurality of selectable countdown times, any one of which can be selected by positioning a mouse cursor on it and clicking a button on mouse 114 (step 502). Countdown before still image capture can begin immediately upon selection of a countdown time using the mouse or at the taking of some other affirmative action, such as by double mouse-clicking on the selected countdown time or depressing a key on keyboard 116 (step 503). As an alternative, a countdown time can be selected using keyboard 116, such as by using the arrow keys on keyboard 116 to highlight a desired countdown time from pull-down menu 306. Another keystroke on a key of keyboard 116, such as the "Enter" key can be used to start the countdown. Of course, one or more mouse-clicks can be used to start the countdown once the desired countdown time is highlighted using keyboard 116. In any event, at the conclusion of the countdown time, camera 102 captures a still image of an object in its field of view, which preferably is transmitted from the capturing conferencing system (one of conferencing system 100 or 112) to the other (step 505). Like the embodiment shown and described in FIG. 2, the embodiment of FIG. 3 also preferably signals a user of an occurrence of a still image capture, such as by the generation of an audible tone or visible signal, and alerts a user to an impending still image capture.

Figure 6:
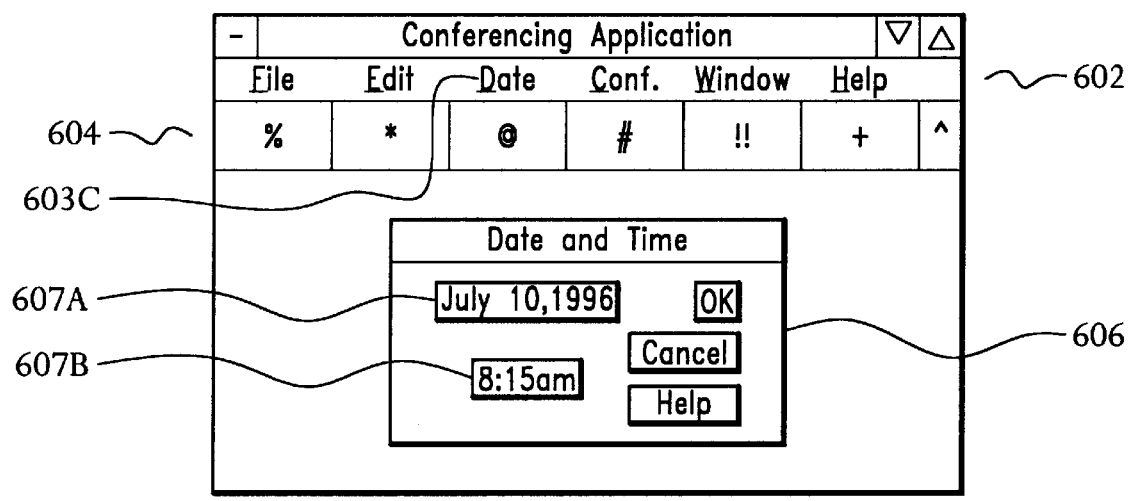
FIG. 6 shows another embodiment of a GUI generated by an application for use in implementing the still image capture of the invention.

In another embodiment of the invention, a user can instruct a conferencing system, such as one of conferencing systems 100 or 112, to capture a still image on a selected date at a selected time. For example, referring to FIG. 6, a third embodiment of a GUI generated by an application for use in implementing the still image capture of the invention, conferencing application 120 or 122 can generate a dialog box 606 in response to keyboard input or a mouse click on a designated button in a toolbar, such as toolbar 604, or on a menu name in menu bar 602, such as "Date" menu name 603c. The dialog box preferably is provided with fields 607a and 607b for inputting the desired information with respect to day and time at which the capture is to occur. The computer counts the passage of time until the specified day and the specified time, on which the still image will be captured.

In another embodiment of the invention, a still image capture occurs upon receipt by microphone 104 of a sound wave generated, for example, by a user at one of conferencing systems 100 or 112 wishing to capture a still image. In this embodiment, a user typically would set camera 102 in a still image capture mode, for example, referring again to FIGS. 2 and 3, by "depressing" "Sound" button 205f on toolbar 204, selecting "Sound" from menu 306 or depressing one or more designated keys on keyboard 116. This action readies conferencing system 100 or 112 and a respective one of camera 102 for a still image capture. A user at one of conferencing system 100 or 112 then can move camera 102 or an object having an image to be captured such that the object is within the field of view of camera 102. The user then generates a sound wave receivable by conferencing system 100 or 112 through microphone 104 to trigger the still image capture. In this embodiment, conferencing applications 120 or 122 preferably include a routine responsive to a signal generated by microphone 104 in response to receipt of the sound wave to cause a still image capture by camera 102. The sound wave can be generated by speaking, clapping or by any other means. Conferencing systems 100 and 112 further can include a mechanism for specific sound recognition, which can be embodied, for example, in conferencing applications 120 and 122. In such an embodiment, only certain sounds will trigger the still image capture by camera 102.

In an alternative embodiment of the above, the trigger can be some other external event, such as a light flash or the like, receivable, for example, by a device which converts incident light energy to an electrical signal, such as a charge-coupled device, or allows a flow of current when struck by light waves, such as a photodiode or phototransistor. The receiving device preferably is mounted on conferencing system 100 or 112, or camera 102.

Another mechanism for triggering a still image capture could be a signal received from a remote location over network 110. For example, a user at conferencing system 100 might wish to take a still image capture using camera 102 at conferencing system 112. The invention allows the user to generate a signal at conferencing system 100, for example by appropriate mouse 114 or keyboard 116 input, which is transmitted over network 110 to conferencing system 112. A GUI generated by conferencing application 120 or 122 can include a button on toolbar 204, such as "Remote" button 205d, or a menu choice such as "Remote" on pull-down menu 306 of menu bar 302 for placing conferencing system 100 or 112 in a mode in which a signal received from a remote computer will cause conferencing system 100 or 112 to capture a still image.

In the above scenario, conferencing system 112 receives over network 110 the signal generated by conferencing system 100 and causes camera 102 to capture a still image, which is transmitted back to conferencing system 100 over network 110 for display on monitor 106 of conferencing system 100. In this embodiment, conferencing applications 120 and 122 control generation of the signals which initiate a remote one of conferencing systems 100 and 112 to capture a still image.

Since a still image can be captured at a remote location without intervention of a user at the remote location, this particular embodiment is highly useful in the security field. For example, an interested party can request a still image capture at an unattended remote location to verify the integrity of the remote location, such as an absence of an intruder or catastrophe, such as a fire. For maximum effect, camera 102 at the remote location (one of conferencing systems 100 or 122) can be provided with a wide-angle lens.

Another embodiment which is useful in the security field again relates to a still image capture based on the occurrence of some external event. In this embodiment, the external event is motion, sensed by a motion detector, such as motion detector 118 having an output coupled to conferencing system 100 or 112. The detector itself can be mounted on conferencing system 100 or 112, or on one of its peripheral devices such as camera 102, or somewhere in the vicinity in which camera 102 is deployed. In any event, in such an embodiment, sensed motion triggers a still image capture, such as by causing motion detector 118 to generate a signal receivable by conferencing system 100 or 112. Conferencing system 100 and 112 can be set in a mode in which sensed motion is a trigger to cause a still image capture by appropriate input through GUI 200 or GUI 300. For example, a mouse click on "Motion" button 205c or on "Motion" in pull-down menu 306 can be used to place conferencing system 100 or 112 in such a mode. Of course, conferencing system 100 or 112 can be placed in such a mode by appropriate input through keyboard 116. Such an embodiment can be used to capture a still image of an intruder or trespasser at a protected site.

In a somewhat related embodiment, a still image capture can be triggered by any change in the image in the field of view of camera 102. For example, conferencing application 120 or 122 can compare an image received through camera 102 to a previously received image. The frequency of sampling preferably is user selectable. In any event, where the image taken during a sampling differs from the immediately preceding sampling, conferencing application 120 or 122 captures the latter image. In some respects, this is similar to the motion detection embodiment, since the introduction of a moving body into a previously static field will trigger capture in each embodiment. In this embodiment, however, camera 102 serves as the motion detector, eliminating a need for a separate motion sensing device. It should be understood that in this embodiment, although camera 102 at one of conferencing systems 100 or 112 may be continuously viewing images, perhaps at a rate of full motion video, such images typically are neither stored nor transmitted to the other of conferencing system 100 or 112. However, upon the occurrence of a change in the image in the field of view of camera 102, the still image which is captured typically would be stored and or transmitted to the other of conferencing system 100 or 112.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to specific logic circuits.

A person having ordinary skill in the art will understand that although a conferencing system having just two nodes is shown and described in FIG. 1, the invention can be used with networks having a great many remotely located nodes, such as the Internet, to enable a still image captured at one of the nodes to be transmitted to all of the other nodes. Furthermore, the invention has been described above in reference to conferencing systems. It should be understood that the term conferencing system is used broadly to include a node or station capable of capturing and transmitting video or still images and is not limited to those conferencing systems used exclusively for conducting a video conference. In an embodiment of the invention, a conferencing system is a suitably configured personal computer.

It should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. In a computer system comprising a computer coupled to a video camera and to a microphone, a method for capturing a still image, the method comprising the steps of:
   (a) instructing, with a human user, the computer to enter an audio-triggered still image capture mode which causes the computer system to be ready to capture a still image at an occurrence of an audio waveform trigger generated by the human user and receivable by the microphone, wherein the human user must be positioned near the computer and unable to physically aim the video camera when performing said instructing;
   (b) aiming, with the human user, the video camera so that a field of view of the video camera includes a scene of interest;
   (c) generating, with the human user, the trigger after said aiming; and
   (d) capturing the still image with the video camera in response to the trigger.

2. The method of claim 1, wherein step (a) comprises the step of entering an instruction through one or both of a graphic user interface on a monitor or a keyboard coupled to the computer.

3. The method of claim 1, wherein the audio trigger comprises one of clapping and speaking by the human user.

4. A storage medium for still image capture, wherein the plurality of instructions, when executed by a processor of a computer of a computer system further comprising a video camera and a microphone coupled to the computer, cause the computer system to perform the steps of:
   (a) entering, in response to an instruction by a human user of the computer, an audio-triggered still image capture mode which causes the computer system to be ready to capture a still image at an occurrence of an audio waveform trigger generated by the human user and receivable by the microphone, wherein the human user must be positioned near the computer and unable to physically aim the video camera when performing said instructing;
   (b) receiving the trigger generated by the human user after the human user aims the video camera so that a field of view of the video camera includes a scene of interest; and
   (c) capturing the still image with the video camera in response to the trigger.

5. The storage medium of claim 4, wherein step (a) comprises the step of accepting an instruction through one or both of a graphic user interface on a monitor or a keyboard coupled to the computer.

6. The storage medium of claim 4, wherein the audio trigger comprises one of clapping and speaking by the human user.

7. In a computer system comprising a computer coupled to a video camera and to a motion sensor, a method for capturing a still image, the method comprising the steps of:
   (a) instructing with a human user, the computer to enter a sensed-motion-triggered still image capture mode which causes the computer system to be ready to capture a still image at an occurrence of a sensed motion trigger generated by the motion sensor;
   (b) generating the trigger when motion is sensed by the motion sensor; and
   (c) capturing the still image with the video camera in response to the trigger.

8. A computer system for capturing a still image, comprising:
   (a) a computer;
   (b) a video camera coupled to the computer; and
   (c) a motion sensor coupled to the computer, wherein:
      the computer enters, in response to an instruction by a human user of the computer, a sensed-motion-triggered still image capture mode which causes the computer system to be ready to capture a still image at an occurrence of a sensed motion trigger generated by the motion sensor;
      the computer receives the trigger when the motion sensor senses motion; and
      the computer captures the still image with the video camera in response to the trigger.

9. A computer system for capturing a still image, comprising:
   (a) a computer;
   (b) a video camera coupled to the computer; and
   (c) a microphone coupled to the computer, wherein:
      the computer enters, in response to an instruction by a human user of the computer, an audio-triggered still image capture mode which causes the computer system to be ready to capture a still image at an occurrence of an audio waveform trigger generated by the human user and receivable by the microphone, wherein the human user must be positioned near the computer and unable to physically aim the video camera when performing said instructing;
      the computer receives the trigger generated by the human user after the human user aims the video camera so that a field of view of the video camera includes a scene of interest; and
      the computer captures the still image with the video camera in response to the trigger.

10. The computer system of claim 9, further comprising a monitor having a graphical user interface and a keyboard coupled to the computer, wherein the human user instructs the computer to enter the audio-triggered still image capture mode by using one or both of the graphical user interface and the keyboard.

11. The computer system of claim 9, wherein the audio trigger comprises one of clapping and speaking by the human user.

* * * * *